United States Patent [19]

Aoki et al.

[11] 4,303,553
[45] Dec. 1, 1981

[54] NEUTRON-PROTECTION HEAT INSULATING MATERIAL

[75] Inventors: Susumu Aoki, Yokohama; Hirosi Asaumi, Kamakura; Shigeo Take, Yokohama; Junichi Miyakoshi, Tokyo; Hiroshi Takemoto, Fujisawa; Kenta Kabayama, Yokohama, all of Japan

[73] Assignees: Nippon Asbestos Co., Ltd.; Japan Nuclear Ship Research and Development Agency, both of Tokyo, Japan

[21] Appl. No.: 946,570

[22] Filed: Sep. 28, 1978

[51] Int. Cl.$^2$ .................. G21F 1/06; G21C 11/06
[52] U.S. Cl. ........................ 252/478; 106/99; 250/517; 250/515; 252/62; 423/331; 428/443; 428/920; 376/288; 376/289; 376/904
[58] Field of Search ............ 252/478, 62; 106/99; 428/920, 443; 176/DIG. 2, 87; 250/517, 518; 423/331

[56] References Cited

U.S. PATENT DOCUMENTS

| | | | |
|---|---|---|---|
| 2,626,213 | 1/1953 | Novak | 252/313 R |
| 3,154,463 | 10/1964 | Kjell-Berger | 428/920 |
| 3,449,202 | 6/1969 | Bowen | 252/62 |
| 3,661,603 | 5/1972 | Nicol | 106/90 |
| 3,663,250 | 5/1972 | Gerow | 252/62 |
| 3,884,839 | 5/1975 | Bon et al. | 176/DIG. 2 |
| 3,945,887 | 3/1976 | Lemercier | 176/DIG. 2 |

FOREIGN PATENT DOCUMENTS 1415153 9/1965 France ..................... 250/518
1169851 11/1969 United Kingdom .

OTHER PUBLICATIONS

Hodge, N. et al., "Neutron–Shield Materials", *Nucleonics* 19 (11) (Nov. 1961) pp. 158-166.

*Primary Examiner*—Deborah L. Kyle
*Attorney, Agent, or Firm*—Thomas R. Morrison

[57] ABSTRACT

A neutron protection thermal insulating material is obtained by adding a boron compound and, if necessary, a hydrous compound, to chrysotile asbestos fibers. To form the material, the asbestos is opened with the use of a surface active agent in the presence of water. The boron compound is added and air bubbles are incorporated into the mixture which is then dried, molded and compressed. The resulting product is characterized by a construction wherein the opened asbestos fibers are oriented in substantially parallel relation to each other and in the direction perpendicular to the compression direction and air pockets are flatly arranged between the fibers and substantially parallel thereto to reduce thermal conduction through the material in the direction parallel to the direction of compression.

14 Claims, 6 Drawing Figures

FIG. IA
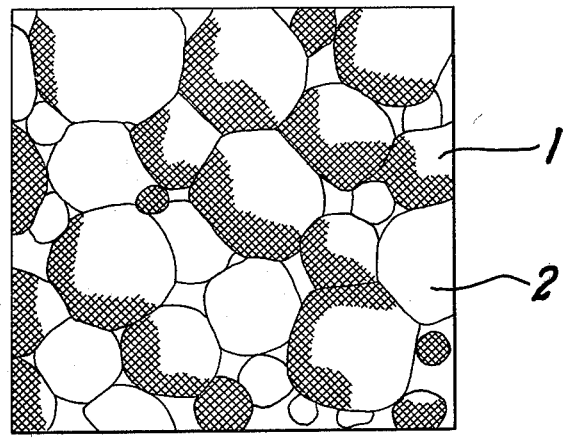
FIG. IB
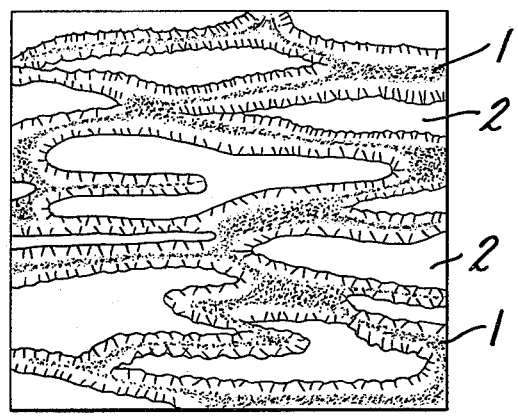
FIG. IC
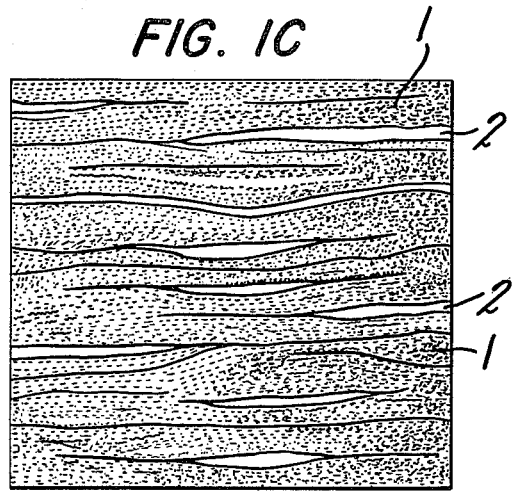

NEUTRON-PROTECTION HEAT INSULATING MATERIAL

BACKGROUND OF THE INVENTION

The present invention relates to improvements in or relating to a neutron-protection thermal insulating material capable of moderating and absorbing neutrons.

Usually there is a certain possibility that neutrons will leak from a nuclear reactor. The leaking neutrons give rise to harmful radioactivity, which is highly damaging to the human body and equipment. For this reason, the nuclear reactor is surrounded with a heavy concrete containing boron. Such a boron-containing heavy concrete is so heavy that it exercises a great shielding effect on gamma rays. In addition, this concrete contains boron has a great neutron absorption cross section so that it produces excellent neutron absorption. Due to its safe service temperature ranging from 70° to 90° C., however, this concrete cannot be applied directly to the circumference of a reactor vessel maintained at about 280° C. Consequently, a special measure is taken for thermally insulating the heavy concrete shielding material from the heat of the reactor vessel by interposing a thermal insulating material therebetween. As the thermal insulating material, use has heretofore been made of a radiant thermal insulating material comprising the combination of a metal plate and a metal foil. Sine such a radiant thermal insulating material does not contribute to moderating and absorbing neutrons, the neutrons leaking through the reactor can rise in the space between the reactor vessel and the heavy concrete shielding material occupied by the radiant thermal insulating material in scattering fashion to raise the upwardly directed neutron level. This results in a large quantity of neutrons leaking through the upper shielding material.

Accordingly, it has been proposed to use a shielding material capable of thermally insulating the aforesaid heavy concrete from the reactor vessel and also capable of moderating and absorbing neutrons. One such shielding material is composed of asbestos material containing a boron compund which is formed into a plate. But this material has a fatal defect in that, when its neutron-shielding capability is enhanced by increasing its density, it correspondingly suffers an increase in thermal conductivity.

SUMMARY OF THE INVENTION

The present invention avoids the defect of the aforesaid asbestos shielding material and has for its main object to provide a neutron-protection thermal insulating material which has a thermal conductivity maintained at a low value, even when the bulk density of an asbestos plate acting as a shielding material is increased, and excels in neutron slowing-down and absorptive powers.

The neutron-protection thermal insulating material according to the present invention is obtained by adding a boron compound and, if necessary, a hydrous compound to the chrysotile asbestos fibers prepared by subjecting the chrysotile asbestos used as an asbestos material to minute opening with the use of a surface active agent in the presence of water and incorporating air bubbles into the resultant product to form an air bubble-containing mixture followed by drying, molding and compression. The resulting material is characterized by a construction wherein the thus opened chrysotile asbestos fibers in the mixture are orientated in substantially parallel relation to each other and in the direction perpendicular to the compression direction and air bubbles are flatly arranged between the fibers and in substantially parallel relation thereto.

DETAILED DESCRIPTION OF THE INVENTION

The composition and construction of the present invention will now concretely be explained with reference to the accompanying drawings, in which:

FIGS. 1A to 1C are views showing steps in attaining the compressed state of the neutron-protection heat insulating material observed under a microscope;

Figure 3:
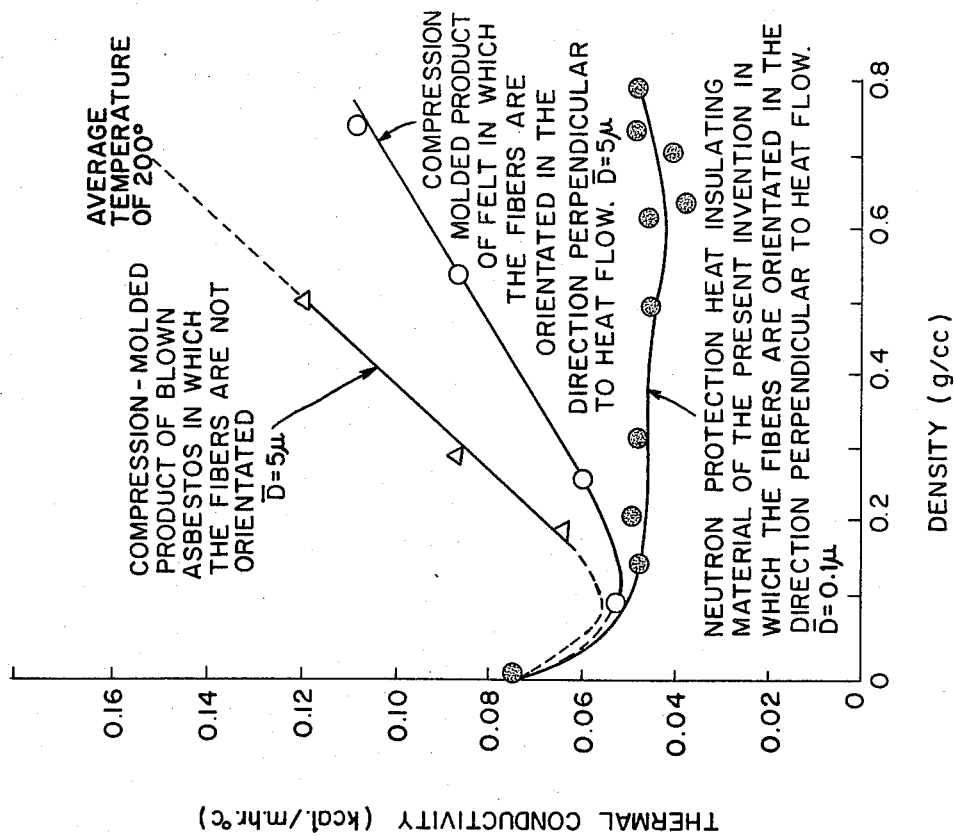
FIG. 3 is a graph showing the manner in which the relationship between the density and thermal conductivity of the heat insulating material varies with the fiber diameter.

In the chrysotile asbestos, fine fibers each having a fiber diameter of 0.02 to 0.05 microns are aggregated to create a fiberous state. This asbestos is generally opened through mechanical impact produced by means of a miracle mill, turbo-mill, pulper, beater or the like. Since in the chrysotile asbestos the aggregating power of fibers is strong, mechanical opening method merely provides an asbestos fiber having a thickness of 5 to 10 microns.

However, it is found that the chrysotile asbestos may be opened to a state that is close to a single fiber having a fiber diameter of about 0.1 microns by subjecting it to dispersing treatment with water in an amount about 40 to 50 times the weight of the asbestos material and an (anionic) surface active agent.

The thus finely opened chrysotile asbestos is then added with a boron compound and is mechanically incorporated with air bubbles to prepare an expanded slurry. This expanded slurry is placed in a molding flask followed by drying, and is then calcined at 300° to 400° C. to remove the surfactant so that a spongy expanded chrysotile asbestos with a bulk specific gravity of about 0.01 g/cm$^3$ is obtained. This expanded chrysotile asbestos is then compressed to about 1/20 to 1/100 to obtain a desired neutron-protection heat insulating material.

The neutron-protection thermal insulating material formed as above-mentioned contains large quantities of hydrogen and boron, the former serving to moderate neutrons and the latter serving to absorb neutrons. In addition, this material has an extremely low thermal conductivity, excels in heat resistance and is of composition free from any activation. For example, it is unlikely that this material may be ignited by fire produced at the time of welding casings and so on.

The neutron-absorbing effect is accomplished by the boron compound added to the chrysotile asbestos. The neutron-moderating effect is accomplished by the hydrogen contained in the chrysotile asbestos. The chrysotile asbestos is a hydrous magnesium silicate crystal, which retains 13 to 15 wt. % of water of crystallization (1.44 to 1.66 wt. % calculated as hydrogen concentration) in its structure. This means that the concentration of the hydrogen acting as the moderator for neutrons is quite high and the water of crystallization is in a stable state at a temperature lower than 500° C. Consequently, this asbestos can safely be used where the temperature of the source of heat and neutrons is less than 500° C.

Since the chrysotile asbestos is fiberous, it can provide light-weight thermal insulation and, when used as a shielding material, it undergoes less sedimentation etc. caused by vibration and the respective parts thereof retain their neutronprotection properties for a long period of time. Furthermore, chrysotile asbestos has an extremely fine fiber diameter in the order of 0.02 to 0.05 microns as previously described and a large specific surface area in the order of 10 to 50 m²/g. Consequently, when a pulverulent material is added to the asbestos, the material is sufficiently absorbed into the asbestos without inviting easy separation therebetween due to vibration. Thus the asbestos has the physical property that it shows satisfactory absorption to the pulverulent material. This permits the uniform addition of a boron compound or other hydrous additives without the use of any binder.

As the boron compound to be added to the chrysotile asbestos as the neutron-absorbing material, use is made of such borates such as metal boron, boron carbide, boron nitride, boric acid, borax and so on. The amount of boron added, which is dependent upon the required neutron-absorptive power, may usually be in the range of 5 to 40% of the heat insulator formed into the product. It is desirable to install the aforesaid thermal insulating material in an iron or stainless steel casing for installation with a view to avoiding radioactive dust resulting from the thermal insulating material; however, the molded thermal insulating material may be used without a casing, if necessary. When using such molded thermal insulating material, a small quantity of a heat resistant binder may be used to improve the maintenance of shape and the strength required during transportation and installation. A larger amount of the binder will result in a decrease in the amounts of the hydrogen and boron contained in the shielding thermal insulating material. For this reason, the amount of the binder should be as small as possible and should be preferably restricted to less than 20%.

To the neutron-protection heat insulating material constructed as previously described, a hydrous compound having a water content higher than that of the chrysotile asbestos may be added so as to increase the concetration of the hydrogen producing the neutron-moderating effect. As the hydrous compound, use may be made of hydroxides such as magnesium hydroxide with a water content of 31 wt. %, aluminium hydroxide with a water content of 35 wt. %, ferrous hydroxide with a water content of 20 wt. %, ferric hydroxide with a water content of 25 wt. % and titanium hydroxide with a water content of 31 wt. %, and hydrous salts such as boric acid with a water content of 39 wt.% and hydrous magnesium borate with a water content of 14 to 30 wt.% as well as hydrous minerals such as alumina cement hydrate with a water content of 20 to 25 wt. %. These materials are listed because they excel in hydrogen content and heat resistance. However, it is also essential to select a compound that continues to retain the hydrogen required for shielding neutrons at a temperature at which the shielding heat insulant is used. Among the foregoing hydrous compounds magnesium hydroxide is the preferred hydrous compound since it permits water to be liberated therefrom only at temperatures above at least 340° C., excels in heat resistance and has a higher water content.

Since chrysotile asbestos has a water content ranging from 13 to 15 wt. %, the foregoing hydrous compound is effective for shielding neutrons when its water content is greater than 15 wt. %. The more of this compound added, the better the neutron-shielding power but the greater the thermal conductivity and the lower the heat resistance. Accordingly, it is preferable to determine the amount of the hydrous compound added in consideration of the desired shielding and heat insulating powers. The addition of a metal hydride may possibly be considered so as to raise the hydrogen concentration; however, this substance is not preferable for use. This is generally because it is susceptible to oxidation at elevated temperatures and is ignited by fire produced at the time of welding casings etc.

As the surface active agent used in the present invention, use may be made of soda alkyl aryl sulfonates such as soda dodecyl benzene sulfonate, soda dialkyl sulfosuccinic acids such as soda dioctyl sulfosuccinic acid and soda carboxylates such as soda oleate.

In the neutron-protection thermal insulating material formed according to the foregoing manner, the chrysotile asbestos is opened to fibers each having a fine diameter close to that of a single fiber with the aid of a surface active agent in the presence of water, is mixed with air bubbles and is compression-molded. By this compression-molding treatment, the fibers contained in the thus molded body are oriented in substantially parallel relation to each other and in the direction normal to the compression direction and the air bubbles are flatly arranged between the fibers and in substantially parallel relation to the fibers, whereby a composite layer of the fiber layer and the air layer is formed. Therefore, the molded body has extremely low thermal conductivity and excellent heat resistance in spite of its bulk density being greater. FIGS. 1A to 1C are sketches showing the molded body observed under a scanning type electron microscope. FIG. 1A shows an air bubble-chrysotile asbestos mixture having a bulk density of 0.01 g/cm³ (50 magnifications); FIG. 1B an air bubble mixture compressed to a bulk density of 0.10 g/cm³ (1000 magnifications); and FIG. 1C an air bubble mixture further compressed to a bulk density of 0.5 g/cm³ (1000 magnifications). In the drawings, numeral 1 denotes fibers and 2 air bubbles.

The characteristic features of the present invention will now concretely be explained with reference to the following examples.

EXAMPLE 1

| Chrysotile asbestos (KB-4T) | 90 wt. parts |
| B₄C | .5 wt. parts |
| Anionic surfactant (Aersol-OT) | 5 wt. parts |
| Water | 5000 wt. parts |

A mixture of the aforsaid chrysotile asbestos, surfactant and water were sufficiently stirred to open the chrysotile asbestos to fibers (of about 0.1 microns diameter) to thereby prepare a highly viscous slurry. After the B₄C was added to this slurry, minute air bubbles were introduced into the resultant product by mechanical means to form an air bubble mixture having a density of about 0.01 g/cm³. This mixture was then compressed to about 1/50 on a roll press to obtain a sheet-like neutron-protection heat insulant having a bulk density of 0.5 g/cm³. This thermal insulating material was found to have a hydrogen content of 0.0070 g/cm³ and a thermal conductivity of 0.039 kcal/m.h.°C. at an average temperature of 200° C.

EXAMPLE 2

| Chrysotile asbestos (Bell8T-700) | 45 wt. parts |
| --- | --- |
| B₂O₃ | 15 wt. parts |
| Magnesium hydroxide | 40 wt. parts |
| Anionic surfactant | 10 wt. parts |
| Water | 5000 wt. parts |

A mixture of the aforesaid chrysotile asbestos, surfactant and water were sufficiently stirred to open the chrysotile asbestos to fibers (of about 0.1 microns diameter) to prepare a highly viscous slurry. After the magnesium hydroxide and B₂O₃ were added to this slurry, minute air bubbles were introduced into the resultant product by mechanical means to form an air bubble mixture having a density of about 0.02 g/cm³. This mixture was placed in a molding flask, dried for 5 hours at 120° C., compressed to about 1/40 on a press and heat-treated for 30 minutes at 260° C. to obtain a sheet-like neutron-protection heat insulant having a bulk density of 0.8 g/cm³. This heat insulating material was found to have a hydrogen content of 0.0163 g/cm³ and a thermal conductivity of 0.049 kcal/m.h.°C. at an average temperature of 200° C.

EXAMPLE 3

| Chrysotile asbestos (Bell3T) | 56 wt. parts |
| --- | --- |
| B₄C | 11 wt. parts |
| Magnesium hydroxide | 27 wt. parts |
| Anionic surfactant (Aersol-OT) | 6 wt. parts |
| Water | 5000 wt. parts |

A mixture of the aforesaid chrysotile asbestos, surfactant and water were sufficiently stirred to open the chrysotile asbestos to fibers (of about 0.1 microns diameter) to prepare a highly viscous slurry. After the magnesium hydroxide and B₄C were added to this slurry, minute air bubbles were introduced into the resultant mixture by mechanical means to form an air bubble mixture having a density of about 0.02 g/cm³. This mixture was placed in a molding flask, dried for 5 hours at 120° C. and heat-treated for 30 minutes at 300° C. to remove the surfactant. The resultant product was compressed to about 1/50 on a press in superposed fashion to obtain a board-like neutron-protection heat insulant having a density of 1.0 g/cm³. This heat insulating material was found to have a hydrogen content of 0.0186 g/cm³.

Figure 2:
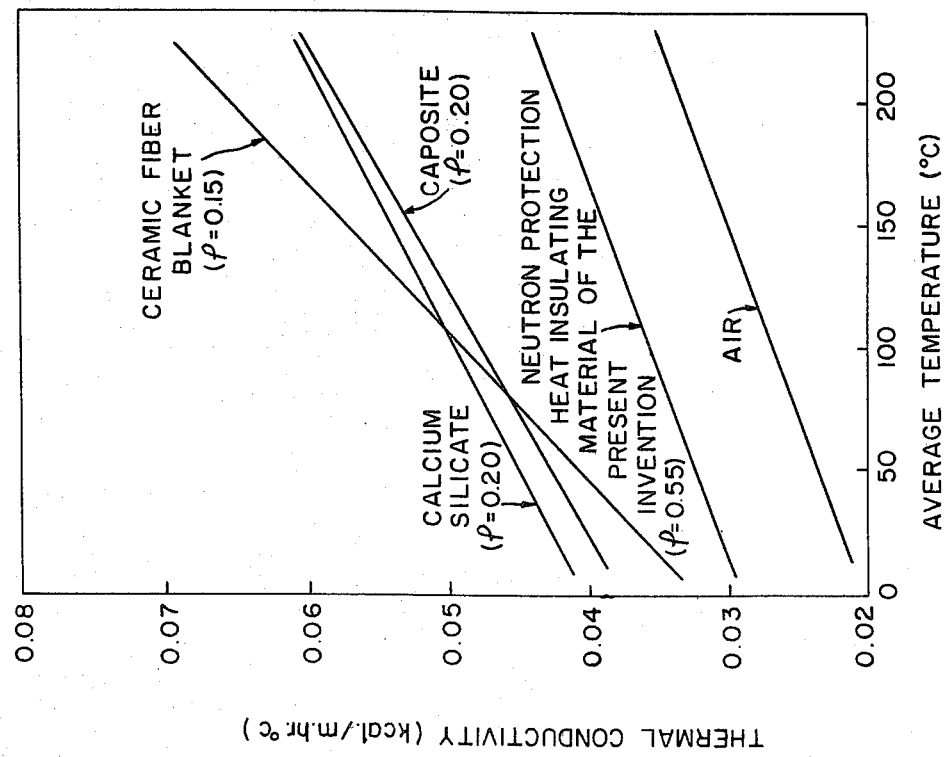
FIG. 2 is a graph showing the having various densities thermal conductivity of heat insulating material including the material of the present invention.

The graph of FIG. 2 shows the results of measurements made on the caposite (trade name, a mixture of 85 wt.% of asbestos and 15 wt.% of soda silicate), ceramic-fiber blanket and calcium silicate-molded body that have been heretofore regarded as a good thermal insulating material and the neutron-protection thermal insulating material, having a bulk density of 0.55 g/cm³, prepared according to the present invention for their thermal conductivity according to JIS A-1414. From this graph, it is found that the neutron-protection thermal insulating material has heat insulation properties much better than those of the conventional thermal insulant, although the former is larger than the latter in bulk density. Furthermore, it has been found that the temperature gradient of thermal conductivity versus the average temperature is considerably gentle, ie., somewhat steeper than that of air, and that the heat insulation properties at a high-temperature portion are further enhanced in comparison with the conventional thermal insulant.

In order to determine the thermal conductivity which is dependent upon the opening degree (fiber diameter) of the chrysotile asbestos and the bulk density of the molded body, a molded body was prepared by opening the chrysotile asbestos (to fibers of about 5 microns diameter) using a turbo-mill in a known manner to prepare chrysotile asbestos felt and then compression-molding the felt to a bulk density of 0.2 to 1.0 g/cm³. The thermal conductivity of this material and a neutron-protection thermal insulating material, having a bulk density of 0.2 to 1.0 g/cm³, prepared according to the foregoing example were measured to obtain the results as set forth in the graph of FIG. 3. From this graph, it is seen that the crysotile asbestos felt prepared in a known manner has a thermal conductivity which increases in accordance with bulk density, but the neutron-protection thermal insulant according to the present invention has a thermal conductivity which remains substantially constant as its density is increased. This feature typical of the present invention is not found in the prior art heat insulating material.

It may be assumed that this phenomenon is caused by the fiber diameter of the chrysotile asbestos as well as the number and shape of air layers divided in the molded body dependent upon the orientation of the fibers. Theoretical consideration will now be given to this phenomenon.

Figure 4:
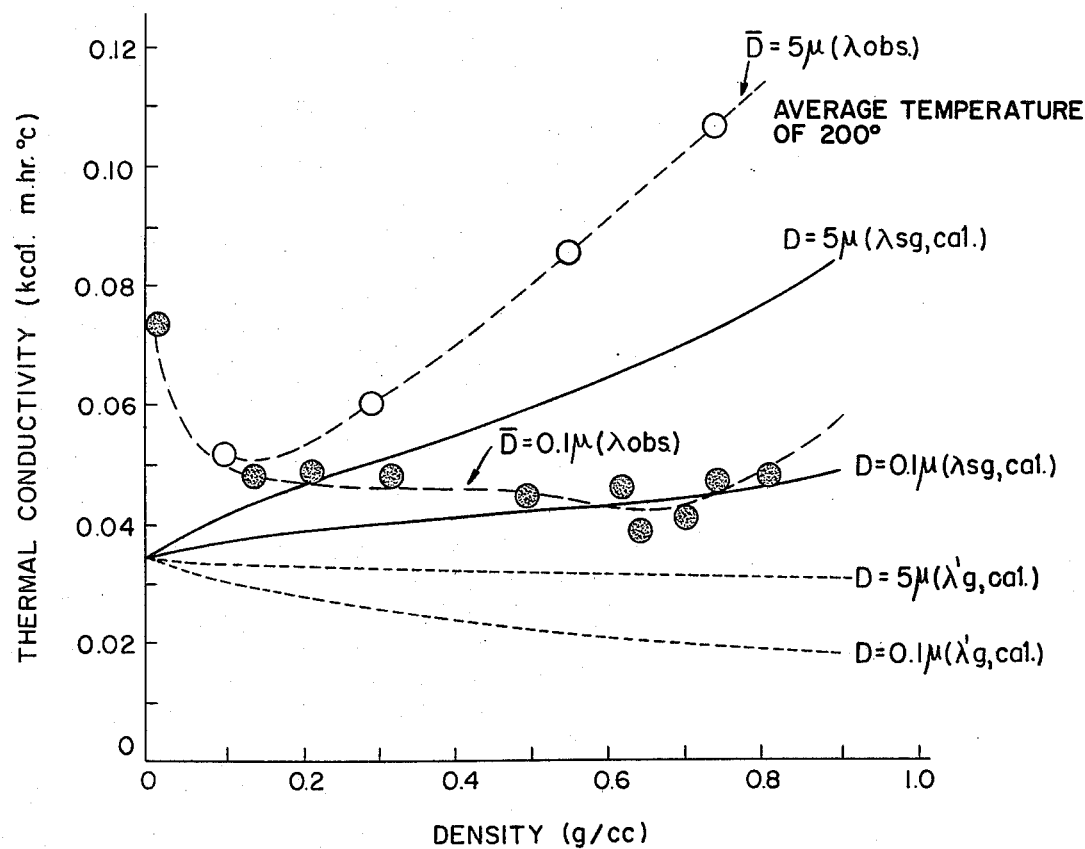
FIG. 4 is a graph showing the relationship between the density and thermal conductivity of the heat insulating material in terms of the calculated and observed values.

FIG. 4 shows the calculated values for the thermal conductivity of the chrysotile asbestos-molded bodies in which the fibers are orientated in the direction normal to a heat flow by compression and which are different from each other in fiber diameter and bulk density as well as the values observed for thermal conductivity of the chrysotile asbestos felt (fiber diameter:5 microns) prepared in the prior art manner and the neutron-protection heat insulating material (fiber diameter:0.1 microns) prepared in the foregoing examples.

As the model for calculation, use was made of a prismatic aggregate of fibers in which the fibers make no contact with each other. The chrysotile asbestos heat insulating material is composed of fibers and air layers minutely divided by the fibers. The thermal conductivity of the air layers does not substantially undergo any change by the density of the molded body under the conditions that the fiber diameter is 5 microns, but it suffers a significant decrease with an increase in the density of the molded body under the conditions that the fiber diameter ranges from 0.1 to 0.05 microns. This is expressed by the equation $$\lambda_g' = \lambda_g \cdot L_f/(L_f + L_g)$$

wherein $\lambda_g'$ denotes the thermal conductivity of the air layers, $\lambda_g$ the thermal conductivity of air, $L_f$ the distance between the fibers and $L_g$ the average free path of air. With the fiber diameter of 5 microns, the distance ($L_f$) between the fibers merely suffers only a small reduction when the density is increased. With the fiber diameter of 0.1 to 0.05 microns, on the other hand, the distance ($L_f$) between the fibers sustains a marked reduction.

On the other hand, the greater the density of the heat insulant, the greater the thermal conductivity of the heat insulant (fiber layers). This is because the volume ratio of the fibers is correspondingly increased and the thermal conductivity of the fibers per se attains a value larger than that for the thermal conductivity of air by two orders of magnitude. The relationship between the thermal conductivity of the air layers and that of air is expressed by $$\lambda_{sg} = \frac{1}{(1-f^{\frac{1}{3}})\lambda_g' + 1/[(f^{\frac{1}{3}}-1)\lambda_g' + \lambda_s]}$$

wherein $\lambda_{sg}$ denotes the thermal conductivity of the fiber layers, f the volume ratio of the fibers and $\lambda_s$ the thermal conductivity of the fibers. The symbol $\lambda_{sg}$ represents a calculated value for the thermal conductivity of the thermal insulating material (fiber layers).

In the drawing, the equation D=5 $\mu$obs. wherein D=the fiber diameter and the abbreviation "obs"=the observed value denotes an observed value for the thermal conductivity of the compression-molded body of the chrysotile asbestos felt. In this case, the observed value is much larger than the calculated value. This is considered to be caused by the fact that, although contact among the fibers is not taken into account in the model, appreciable heat transfer is in fact brought about by this contact.

The equation D=0.1 $\mu$obs. denotes an observed value for the thermal conductivity of the neutron-protection heat insulant according to the foregoing example. At a density of more than about 0.4 g/cc, in this case, the calculated value is in good agreement with the observed value. From this fact, it is assumed that the heat transfer caused by contact among the fibers is less in the neutron-protection heat insulant, and that the arrangement of the fibers is relatively close to that of the model. It is also presumed that contact among the fibers in the fiber layer (bubble film) having a structure close to the model undergoes no appreciable changes by compression (ie., an increase in density), that is, the bubble film itself is not substantially destroyed, but only the air bubbles are merely compressed. At a density of less than 0.3 g/cc, the observed value for the thermal conductivity of the shielding heat insulant is somewhat larger than the calculated value. This will probably be because the influence of radiation is virtually negligible in a lower density range, whereas the influence of radiation on the increase in heat transfer is marked in a higher density range.

In what follows, the neutron-shielding power of the neutron-protection thermal insulating material constructed as previously described will now be considered.

In most cases, the heat insulating material used heretofore in atomic energy technology is a metallic insulating material; however, this material is virtually free from any neutron-shielding power. A material having both the neutron-shielding power and heat insulating power, such as the aforesaid neutron-protection heat insulant, is not obtainable from the prior art heat insulating material. From this reason, comparison experiments were undertaken using the asbestos heat insulant, Caposite, which is considered to have relatively good neutron-shielding power in view of its elementary material composition and is used as a heat insulating material in atomic energy technology and the aforesaid neutron-protection heat insulating material for its neutron-shielding power.

Figure 5:
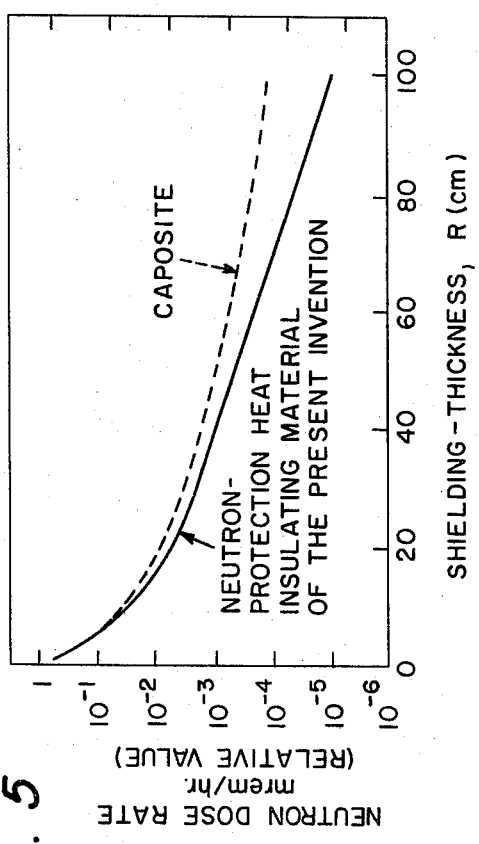
FIG. 5 is a graph showing the neutron dose rate of the heat insulating material.

FIG. 5 is a graph showing the neutron dose rates of the aforesaid neutron-protection heat insulating material and Caposite vs. the shielding thickness for comparison of the tendencies for the overall neutron dose rates to decay in the case of placing a radiation source in only the group (the eleventh group) with its mean energy being 1.5 MeV. In the drawing, the upper dotted line denotes the case of the Caposite, and the lower solid line the case of the neutron-protection heat insulating material having a density of 0.55 g/cm$^3$. From this graph, it is found that the dose rate through the aforesaid neutron-protection heat insulating material is lower than the Caposite by one order of magnitude at a shielding thickness of 100 cm.

Figure 6:
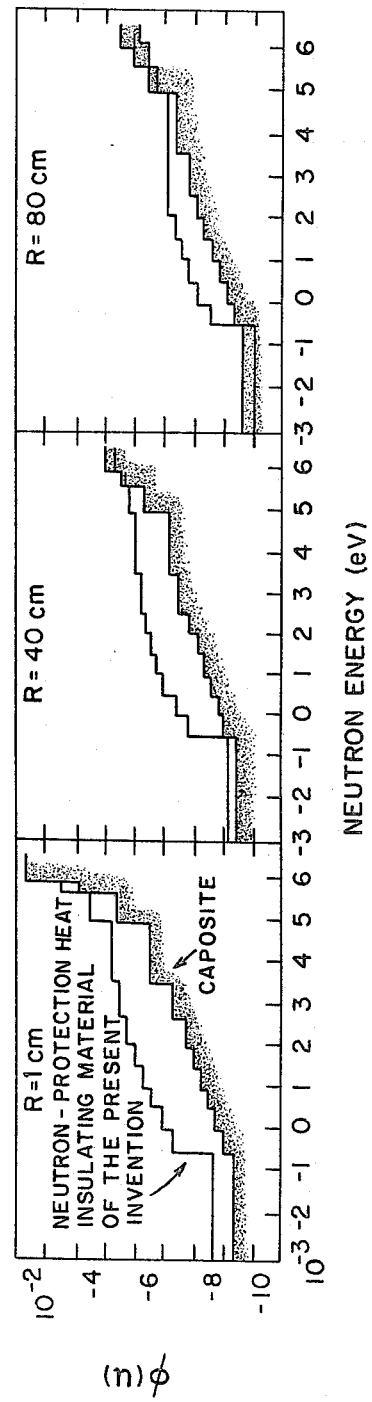
FIG. 6 is a spectral diagram of the neutron energy.

FIG. 6 shows energy spectra at radii of 1 cm, 40 cm and 80 cm. From this spectral change, it is found that the aforesaid neutron-protection heat insulating material provides a spectrum softer than Caposite does.

As mentioned above, the neutron-protection heat insulating material according to the present invention is a dried, molded and compressed air bubble mixture composed of the chrysotile asbestos fibers opened with the aid of a surface active agent in the presence of water and a boron compound, in which the thus opened chrysotile asbestos fibers in the mixture are orientated in substantially parallel relation to each other and in the direction perpendicular to the compression direction and the air bubbles are flatly arranged between the fibers and in substantially parallel relation to the fibers. Thus, this neutron-protection heat insulating material has an extremely low thermal conductivity and a satisfactory effect on the moderation and absorption of neutrons, and excels in heat resistance. Hence this material is most effective for use in the material for preventing neutron leakage caused by the reflection of a primary shielding material upon the upper and lower surface portions of a reactor, cyclotron etc., which reflection has offered some problems. This material will also contribute to a reduction in the shielding weight loaded on the reactor for ships, etc. Thus, the present invention is of great practical value in the atomic energy industrial art.

While the present invention has been described by referring to the specific embodiment shown in the accompanying drawings, it is to be understood that the invention is not limited to such illustrative embodiment, but various changes can be made within the scope of the invention defined by the appended claims.

What is claimed:

1. A neutron-protection heat insulating material comprising:
   (a) a unidirectionally compressed sheet-like structure containing chrysotile asbestos fibers having a diameter of about 0.1 microns and having a density of from about 0.2 to about 1.0 g/cm$^3$;
   (b) a boron-containing compound in the amount of from about 5 to about 40 percent by weight of the sheet-like structure; and
   (c) said sheet-like structure containing a plurality of substantially flat air spaces having substantially greater dimensions normal to the direction of compression than parallel thereto.

2. The neutron-protection heat insulating material recited in claim 1 further comprising a hydrous compound in said sheet-like structure.

3. The neutron-protection heat insulating material recited in claim 2 wherein said hydrous compound is magnesium hydroxide.

4. The neutron-protection heat insulating material recited in claim 2 wherein said hydrous compound contains boron.

5. The neutron-protection heat insulating material recited in claim 2 wherein said hydrous compound has a water content exceeding 15 percent.

6. The neutron-protection heat insulating material recited in claim 1 further comprising a binder.

7. The neutron-protection heat insulating material recited in claim 6 wherein said binder comprises less than 20 percent of said sheet-like structure.

8. The neutron-protection heat insulating material recited in claim 1 further comprising a metallic jacket covering said sheet-like structure selected from the group consisting of iron and stainless steel.

9. A method of manufacturing a neutron-protection heat insulating material comprising:
 (a) mixing one part of chrysotile asbestos with from about 40 to about 50 parts of water;
 (b) adding an effective amount of surface active agent and stirring to open said asbestos to fibers of about 0.1 microns diameter;
 (c) adding a boron-containing compound to the mixture in the ratio of from about 5 to about 40 percent of the finished product;
 (d) introducing air bubbles into the mixture to produce a mixture having a dried density of no more than about 0.02 g/cm$^3$;
 (e) drying the mixture; and
 (f) unidirectionally compressing the dried mixture into a sheet having from about 1/20 to about 1/100 of its uncompressed thickness.

10. The method recited in claim 9 further comprising said step of unidirectionally compressing being continued until the resulting sheet has a bulk density of from about 0.2 to about 1 g/cm$^3$.

11. The method recited in claim 9 further comprising adding a hydrous compound to said mixture before the step of introducing air bubbles.

12. The method recited in claim 9 further comprising adding a binder to said mixture before the step of introducing air bubbles.

13. A neutron-protection heat insulating material made by the method of any of claims 9, 10, 11 or 12.

14. The method recited in claim 9 wherein said dried density is from about 0.01 to about 0.02 g/cm$^3$.

* * * * *